May 28, 1963 S. D. HARPER 3,091,700
ELECTRICAL DIGITAL CODING APPARATUS
Filed March 10, 1959
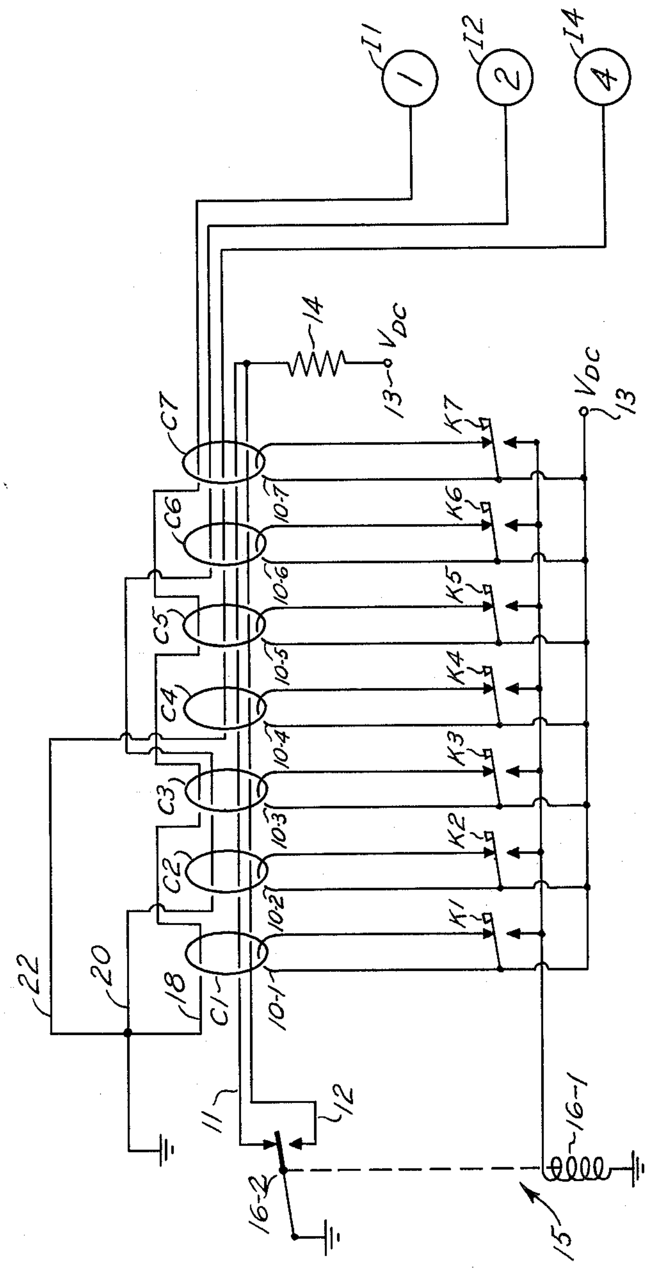
INVENTOR.
S. D. HARPER
BY Henry L. Hanson
ATTORNEY United States Patent Office 3,091,700

Patented May 28, 1963

3,091,700
ELECTRICAL DIGITAL CODING APPARATUS

Samuel D. Harper, Auburndale, Mass., assignor to Minneapolis-Honeywell Regulator Company, Minneapolis, Minn., a corporation of Delaware Filed Mar. 10, 1959, Ser. No. 798,532
6 Claims. (Cl. 307—88)

A general object of the present invention is to provide a new and improved electrical apparatus useful in the handling of digital information. More specifically, the present invention is concerned with a new and improved apparatus for converting one form of input signal into a further form of coded output signal wherein such converting apparatus is characterized by its simplicity as well as the reliability of the overall conversion circuitry.

In the processing of digital information, it is frequently desirable to convert a representation of digital information in one form to a further distinct but related form. For example, it is frequently desirable to convert an electrical signal associated with the operation of a manual key into an electrical signal representative of the particular key which has been operated. This type of conversion apparatus finds particular use in apparatus wherein manually operated keys on a typewriter keyboard, or the like, are converted into appropriate electrical code which may well be of the binary coded type.

The conversion apparatus of the present invention has been realized by the use of a plurality of solid state electrical elements. These solid state electrical elements take the form of magnetic cores, which are arranged in an electrical circuit where the flux state of the devices may be selectively changed provided certain other electrical conditions exist. When any core device has the flux therein changed, an output winding coupled thereto will have an electrical signal produced therein which may be associated with appropriate indicating or utilization circuitry. The selective controlling of the changing of the flux of any core device is achieved by the use of shorting windings which will block the flux change as long as the shorting winding is acting on the core device. Thus, by way of the shorting winding, it is possible to selectively control the switching of a plurality of core devices for purposes of producing an output electrical code.

It is therefore a further more specific object of the present invention to provide a new and improved electrical code converting circuit utilizing a plurality of core devices, each adapted to have a shorting winding associated therewith, with the shorting windings of the plurality of core devices being selectively rendered inactive for purposes of converting an input operation into an output electrical code.

Another more specific object of the present invention is to provide a plurality of core devices for use in a digital converter wherein means are provided for inhibiting the switching of the core devices when the associated core device has an electrical switching signal applied thereto so as to inhibit the creation of any output signal on an output winding associated with the core device.

A still further object of the present invention is to provide electrical switching means for controlling shorting windings on a plurality of core devices wherein the switching means, when activated, create an electrical signal tending to change the flux of each of the core devices in the combination.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

The FIGURE is a schematic diagram of an electrical digital coding apparatus according to the invention.

Referring to the single FIGURE, there is here illustrated a plurality of manually operated keys, K1, K2, K3, K4, K5, K6, and K7. As illustrated, these keys K1 through K7 are each associated with a single pole double throw switch having a normally closed contact onto which the blade of the key is normally biased, and a further contact which is adapted to be closed when the key is actuated. The actuation of one of the keys will produce an appropriate binary coded indication of the key operated in a plurality of output indicating devices I1, I2, and I4. These output indicating devices may take any of several well-known forms including lights, relays, amplifiers, and the like.

The conversion circuitry in the present invention comprises a plurality of magnetic core devices C1, C2, C3, C4, C5, C6, and C7. Each of these core devices may be of the saturable type, although the principles of the invention are applicable to any type of magnetic core device which may be blocked from switching when a shorted winding is coupled thereto. Each of the core devices C1 through C7 has an input winding 10—1 through 10—7, said input winding normally acting as a short circuiting winding by way of the associated key devices K1 through K7. Inasmuch as a short circuiting winding exists on each of the core devices C1 through C7, the application of a changing current signal to the core devices will not result in the core flux changing due to the action of the short circuit winding on the core device.

In the FIGURE, all windings are shown as single turn windings, but it is to be understood that multi-turn windings may also be used.

The core flux switching line 11 is associated with each of the core devices C1 through C7 in the same sense. Associated with each of the core devices C1 through C7 in the opposite sense is a further core switching line 12. The switching lines 11 and 12 are connected to a common direct current voltage supply terminal 13 by way of a current limiting resistor 14. The selecting of the lines 11 and 12 is accomplished by way of a relay 15 having an actuating winding 16—1 and a single pole double throw switch 16—2.

A plurality of sense lines 18, 20, and 22 are selectively associated with the core devices C1 through C7 in accordance with the particular code it is desired to produce in the output. In the event, as illustrated, the output code is to be a binary code, the sense line 18 is the $2^0$ sense line of the output circuitry. The sense line 20 then becomes the $2^1$ line while the sense line 22 becomes the $2^2$ output sense line. Thus, the sense line 18 links the core devices C1, C3, C5, and C7. The sense line 20 links the core devices C2, C3, C6, and C7. The sense line 22 thus links the core devices C4, C5, C6, and C7.

In considering the operation of the circuitry illustrated, it should first be noted that when in the deactivated state, all of the key-operated switches K1 through K7 are in the position shown upon the drawing wherein they are shorting the respective input windings 10—1 through 10—7. Further, with the relay 15 in the deactivated state, the switch 16—2 will be in the upper position, as illustrated, so that an electrical circuit may be traced from the direct current voltage terminal 13 through the resistor 14, the switching line 11, and through the switch 16—2 to ground. This will tend to retain all of the core devices C1 through C7 in a predetermined fixed flux state. With each of the core devices in that predetermined state, there will be no output signal in any of the sense lines 18, 20, or 22. When there is no signal induced in any of the output sense windings 18, 20, 22, there will be no resultant signals applied in the indicating circuits I1, I2, or I4. The circuit will remain in this condition until such time as a key is operated.

It is next assumed that an operator actuates the key K3. When the key K3 is actuated, the blade of the key will engage the lower contact associated therewith. A circuit for the relay coil 16—1 will then be created by way of a direct connection to the voltage terminal 13 by way of the switch contacts associated with the key 13. With current flowing through the coil 16—1, the switch contact 16—2 will move to the opposite state so that the switching line 11 will be decoupled from the core devices C1 through C7 and the switching line 12 will be coupled thereto. A circuit may thus be traced from the voltage terminal 13 through the resistor 14, the switching line 12, the lower contact of the switch 16—2, to ground. This reversal of the switch 16 in its position will be effective to cause reversal in the current flowing through the core devices C1 through C7 so that the flux of each of the core devices will tend to change.

When the key K3 is actuated, the short circuit on the input winding 10—3 is removed so that the associated core device C3 may change flux. When the core device C3 switches from one state of flux to another state of flux, there will be a signal induced in each of the sense windings coupled thereto. Inasmuch as these sense windings are the windings 18 and 20, the output indicating devices I1 and I2 will have an appropriate signal applied thereto indicating, in binary terms, that a 3 was the input to the converter.

As soon as the key K3 is released, relay 15 will become de-energized and the switch contacts thereof at 16—2 will be switched back to the state shown in the drawing. Similarly, the key K3 will once again place a short circuit on the winding 10—3. During the transition period from the time that the key K3 is activated to energize relay coil 16—1 until the time that the key K3 returns to its normal state, the core device C3 will once again be switched back to its initial flux state by the switch 16—2 which is adapted to energize the switch line 11 before the short circuit is applied to winding 10—3 by switch K3. Thus, the switch line 11 will be connected to the voltage supply terminal 13 and the switch line 12 will be disconnected therefrom. The circuit will then be in a condition for the activation of a further key.

It will be readily apparent that the activation of any of the other key devices K will be effective to produce an operation similar to that associated with the described operation for the key K3.

It will be readily apparent that, while the apparatus has been described with respect to manually operated key devices, appropriate electronic means may be substituted for effecting the same type of signal conversion. Similarly, an appropriate electronic switching means may be provided as a substitute for the electro-mechanical relay 15 in order to effect the desired switching of the core flux in each of the core devices C1 through C7. Thus, for example, an alternating signal source may be substituted for the relay contacts 16—2. In this event, the keys K1 through K7 require only the normally closed contacts illustrated. The outputs may then be alternating current devices.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. A code generator comprising a plurality of magnetic core devices, a plurality of input windings for said core devices arranged at least one each to each of said core devices, a plurality of output sense windings selectively coupled to said core devices to define a combinatorial code, a core flux switching signal source coupled to each of said core devices, and a plurality of switching means connected to said input windings and being adapted to selectively open circuit said input windings, said switching means being normally closed to effect a direct short-circuit on each of said input windings.

2. A code generator comprising a plurality of magnetic core devices, a plurality of input windings for said core devices arranged at least one each to each of said core devices, a plurality of sense windings selectively coupled to said core devices to define a combinatorial code, a core flux switching signal source coupled to each of said core devices, a plurality of switching means connected to said input windings and being adapted to selectively open circuit said input windings, said switching means being normally closed to effect a direct short-circuit on each of said input windings, and a plurality of indicating means connected to said sense windings.

3. A code generator comprising a plurality of magnetic core devices, a plurality of input windings for said core devices arranged at least one each to each of said core devices, a plurality of sense windings selectively coupled to each of said core devices, a core flux switching signal source coupled to each of said core devices, and a plurality of normally closed switching means connected to said input windings to short circuit said input windings so that any core device so short circuited will have no output on any associated sense winding when said switching signal source is operative.

4. An encoding apparatus comprising a plurality of magnetic core devices, a short circuited winding on each of said core devices, a selectively operable switch in series with each of said short circuited windings, said switch normally closed, means connected to each of said core devices to couple an electrical signal thereto and being adapted to change the flux state of the core only when the associated short-circuited winding is open-circuited by the opening of the associated switch, sense winding means coupled to each core device to sense a change in flux therein, and indicating means connected to each of said sense windings to indicate when any core device has its flux state changed.

5. An encoding apparatus comprising a plurality of magnetic core devices, a short circuited winding on each of said core devices, a switch in series with each of said short circuited windings, means connected to each of said core devices to couple an electrical signal thereto and being adapted to change the flux state of the core, said means being connected to be controlled by one of the switches in series with said short circuit windings, sense winding means coupled to each core device, and indicating means connected to each of said sense windings to indicate when any core device has its flux state changed.

6. An encoding apparatus comprising a plurality of magnetic core devices, a short circuited winding on each of said core devices, a plurality of switches arranged one each to be in series with each of said short circuited windings, means connected to each of said core devices to couple an electrical signal thereto and being adapted to change the flux state of the core, electrical switching means connected to said last named means to activate said means, said switching means being adapted to be activated by any one of said plurality of switches, sense winding means coupled to each core device, and indicating means connected to each of said sense winding means to indicate when any core device has its flux state changed.

References Cited in the file of this patent

UNITED STATES PATENTS

| | | |
|---|---|---|
| 2,733,860 | Rajchman | Feb. 7, 1956 |
| 2,734,182 | Rajchman | Feb. 7, 1956 |
| 2,884,622 | Rajchman | Apr. 28, 1959 |
| 2,922,996 | Young | Jan. 26, 1960 |
| 2,933,618 | Buck | Apr. 19, 1960 |